(12) United States Patent
Tasaki et al.

(10) Patent No.: US 7,697,264 B2
(45) Date of Patent: Apr. 13, 2010

(54) LITHIUM ION CAPACITOR

(75) Inventors: Shinichi Tasaki, Tokyo (JP); Nobuo Ando, Tokyo (JP); Mitsuru Nagai, Tokyo (JP); Atsuro Shirakami, Tokyo (JP); Kohei Matsui, Tokyo (JP); Yukinori Hato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1028 days.

(21) Appl. No.: 10/576,489

(22) PCT Filed: Oct. 19, 2005

(86) PCT No.: PCT/JP2005/019238

§ 371 (c)(1),
(2), (4) Date: Apr. 20, 2006

(87) PCT Pub. No.: WO2006/112067

PCT Pub. Date: Oct. 26, 2006

(65) Prior Publication Data

US 2009/0027831 A1    Jan. 29, 2009

(30) Foreign Application Priority Data

Mar. 31, 2005   (JP) ............................. 2005-104668

(51) Int. Cl.
*H01G 9/00* (2006.01)
(52) U.S. Cl. .................... 361/502; 361/503; 361/504; 361/508; 361/512; 361/516
(58) Field of Classification Search ............... 361/502, 361/503–505, 508–512, 516–519, 523, 525–528; 429/212, 233
See application file for complete search history.

(56) References Cited

U.S. PATENT DOCUMENTS 5,981,107 A * 11/1999 Hamano et al. ........ 429/231.95

(Continued)

FOREIGN PATENT DOCUMENTS

JP     2000-294459     10/2000

(Continued)

OTHER PUBLICATIONS

U.S. Appl. No. 10/584,858, filed Aug. 2006, Tasaki et al.*

(Continued)

*Primary Examiner*—Nguyen T Ha
(74) *Attorney, Agent, or Firm*—Oblon, Spivak, McClelland, Maier & Neustadt, L.L.P.

(57) ABSTRACT

It is to provide a lithium ion capacitor having a high energy density, a high output density, a large capacity and high safety.

A lithium ion capacitor comprising a positive electrode, a negative electrode and an aprotic organic solvent solution of a lithium salt as an electrolytic solution, wherein a positive electrode active material is a material capable of reversibly supporting lithium ions and anions, a negative electrode active material is a material capable of reversibly supporting lithium ions, and the potentials of the positive electrode and the negative electrode are at most 2.0 V after the positive electrode and the negative electrode are short-circuited, characterized in that the positive electrode and the negative electrode are respectively made by forming electrode layers by the positive electrode active material and the negative electrode active material on both sides of a positive electrode current collector and a negative electrode current collector each having pores penetrating from the front surface to the back surface, the capacitor has such a cell structure that the positive electrode and the negative electrode are wound or laminated, and the outermost portion of the wound or laminated electrodes is the negative electrode.

6 Claims, 4 Drawing Sheets

U.S. PATENT DOCUMENTS 6,001,139 A * 12/1999 Asanuma et al. ........... 29/623.3
6,038,123 A *  3/2000 Shimodaira et al. ......... 361/502
6,461,769 B1* 10/2002 Ando et al. ............ 429/231.95
6,781,817 B2*  8/2004 Andelman .................. 361/503

FOREIGN PATENT DOCUMENTS

| WO | 03/003395 | 1/2003 |
|---|---|---|
| WO | WO 2004/097867 A2 | 11/2004 |

OTHER PUBLICATIONS

U.S. Appl. No. 10/576,363, filed Apr. 19, 2006, Matsui et al.
U.S. Appl. No. 10/584,858, filed Jun. 28, 2006, Tasaki et al.

* cited by examiner

LITHIUM ION CAPACITOR

TECHNICAL FIELD

The present invention relates to a lithium ion capacitor having excellent low temperature characteristics, a high energy density and a high output density.

BACKGROUND ART

In recent years, a battery using a carbon material such as graphite as a negative electrode and using a lithium-containing metal oxide such as $LiCoO_2$ as a positive electrode, has been proposed. This battery is a so-called rocking chair battery such that after it is assembled, lithium ions are supplied from the lithium-containing metal oxide as the positive electrode to the negative electrode by charging, and the negative electrode lithium ions are returned to the positive electrode by discharging. This battery is called a lithium ion secondary battery since no lithium metal is used for the negative electrode but only lithium ions are involved in the charge and discharge, and the battery is distinguished from a lithium battery using lithium metal. This battery is characterized with a high voltage, a large capacity and high safety.

Further, as concern for environmental problems is increasing, storage system for clean energy by solar power generation or wind power generation, and power sources for electric automobiles and hybrid electric automobiles which replace gasoline-powered vehicle, have been actively developed. Further, along with the tendency to high quality and high functionality of on-vehicle apparatus and equipment such as power windows and IT devices in recent years, a new power source has been required in view of the energy density and the output density.

As a storage device to be used for such an application which requires a high energy density and high output characteristics, attention has been paid to a storage device called a hybrid capacity comprising a combination of storage principles of a lithium ion secondary battery and an electric double layer capacitor in recent years. As one example, an organic electrolyte capacitor has been proposed (for example, Patent Document 1) in which as a negative electrode, carbon material obtained in such a manner that lithium ions are preliminarily made to be absorbed and supported (hereinafter sometimes referred to as doping) by a carbon material capable of absorbing and releasing lithium ions by a chemical or electrochemical method to lower the negative electrode potential, is used, whereby the energy density can be significantly increased.

Such an organic electrolyte capacitor is expected to show high performance, but has drawbacks such that when lithium ions are preliminarily supported on the negative electrode, the supporting requires a very long time, and it tends to be difficult to make lithium ions be uniformly supported by the entire negative electrode. Particularly, for a large-size, large capacity cell such as a cylindrical apparatus having electrodes wound or a rectangular battery having a plurality of electrodes laminated, it has been considered to be hardly used practically.

To solve such problems, an organic electrolyte battery has been proposed (for example, Patent Document 2), wherein each of a positive electrode current collector and a negative electrode current collector has pores penetrating from the front surface to the back surface, a negative electrode active material is capable of reversibly supporting lithium ions, and lithium ions are supported by the negative electrode by electrochemical contact with lithium metal disposed to face the negative electrode or the positive electrode.

In the organic electrolyte battery in which the electrode current collector has pores penetrating from the front surface to the back surface, lithium ions can move from the front surface to the back surface of the electrode without being blocked by the electrode current collector. Thus, even in a storage device having a cell structure with a large number of electrodes being laminated, it is possible to make lithium ions be electrochemically supported by not only a negative electrode disposed in the vicinity of lithium metal but also a negative electrode disposed distant from lithium metal, via the through-pores.

Further, Patent Document 2 discloses a cell structure of the above organic electrolyte battery using a positive electrode and a negative electrode. FIG. 8 illustrates the cell structure of the above battery wherein lithium metal is provided on the lower portion of an electrode laminate unit. As shown in the drawing, in this cell, positive electrodes 1 formed on a positive electrode current collector 1a and negative electrodes 2 formed on a negative electrode current collector 2a are alternately laminated with a separator 3 interposed therebetween to constitute an electrode laminate unit 6, each of the upper and lower outermost portions of the electrode laminate unit 6 is a negative electrode 2', and lithium metal 4 is disposed to face the lower negative electrode 2'. As the electrodes, the electrodes 1 and 2 in the main portion of the electrode laminate unit 6 are ones having electrode layers on both sides of the current collectors 1a and 2a, and the negative electrodes 2' disposed at the outermost portions of the electrode laminate unit 6 are ones having an electrode layer only on one side. Even when the outermost portion of the electrode laminate unit 6, to which no lithium metal 4 is disposed, is a positive electrode, similarly one having an electrode layer only on one side is used for this positive electrode.

As mentioned above, in a conventional cell, an electrode having an electrode layer only on one side of a current collector is used for each of the outermost electrodes of the electrode laminate unit constituting the cell. The reason will be explained with reference to FIG. 9. FIG. 9 is a schematic cross section illustrating the outermost portion of a conventional organic electrolyte battery. As shown in the drawing, an electrode layer 14 formed on one side "a" of a current collector 13 (having through pores) has a counter electrode layer 15, whereby the electrode layer 14 undergoes charge and discharge together with the counter electrode layer 15. However, since it has no counter electrode layer on the outside surface b (outermost portion), if an electrode layer 14' (imaginary line) is formed on the outside surface b, this electrode layer 14' also undergoes charge and discharge together with the counter electrode layer 15 on the one side "a" via the through pores, and thus a load corresponding to the electrode layer 14 and the electrode layer 14' on both sides of the current collector 13 is applied to the counter electrode layer 15. Therefore, in a case where the outermost electrode is a positive electrode having electrode layers on both sides of the current collector 13, a load corresponding to the positive electrode layers on both sides is applied to one side of the counter negative electrode, whereby the negative electrode potential tends to be low, and lithium metal tends to be deposited, thus causing short circuit. In a conventional organic electrolyte battery, in order to avoid the above phenomenon, the outermost electrode portion is an electrode having no electrode layer 14' on the outside surface b i.e. having an electrode layer 14 only on one side "a" of the current collector 13.

Patent Document 1: JP-A-8-107048
Patent Document 2: WO98/033227

DISCLOSURE OF THE INVENTION

Problems that the Invention is to Solve

As described above, with respect to a negative electrode made of e.g. a carbon material capable of absorbing and releasing lithium ions and supporting lithium ions preliminarily i.e. before charging a cell, the potential of such a negative electrode is lower than that of an activated carbon to be used for an electric double layer capacitor, and thus the withstand voltage of a cell using such a negative electrode in combination with an activated carbon for the positive electrode tends to improve. Further, since the capacity of the negative electrode is very large as compared with that of an activated carbon, an organic electrolyte capacitor (lithium ion capacitor) having the above negative electrode will have a high energy density.

In the above lithium ion capacitor, the cell is constituted as an electrode laminate unit having positive electrodes and negative electrodes alternately laminated with a separator interposed therebetween, and the negative electrodes are sequentially doped with lithium ions from lithium metal disposed to face the positive electrode and/or the negative electrode at the outside of the electrode laminate unit via through pores on electrode current collectors. In such a case, it is preferred that the negative electrode is preliminarily uniformly doped with lithium ions corresponding to the entire lithium metal, the amount of which is determined depending upon the amount of lithium ions to be doped on the negative electrode.

In a conventional lithium ion capacitor, an electrode having an electrode layer only on one side of a current collector is used for each of the outermost electrodes of the electrode laminate unit constituting the cell. Thus, even when the outermost electrode is a positive electrode, negative electrodes can be preliminarily doped with lithium ions in a predetermined amount without an excessive load on a counter negative electrode.

However, in a conventional lithium ion capacitor, both electrode having electrode layers on both sides of a current collector and electrode having an electrode layer only on one side are used in combination as the electrodes of the cell. Thus, the cell assembling operation tends to be very complicated, thus impairing productivity of cell. Further, if these electrodes are not correctly laminated, the cell will be fatally defective, and the cell will no longer be reliable.

The present invention has been made to solve these problems, and its object is to provide a lithium ion capacitor, in which the negative electrode can preliminarily be doped with lithium ions in a predetermined amount securely, and which is excellent in cell assembling workability.

Means of Solving the Problems

To achieve the above object, the present inventors have conducted extensive studies on electrodes constituting a lithium ion capacitor and as a result, found the following. Namely, when current collectors having pores penetrating from the front surface to the back surface are used as current collectors of a positive electrode and a negative electrode, and when the outermost electrode constituting the cell is a negative electrode, even if this negative electrode is a negative electrode having electrode layers on both sides of the current collector and a load corresponding to the electrode layers on both sides of the outermost negative electrode is applied to an opposite positive electrode, the load on the positive electrode has relatively surplus to upper limit potential, and thus there will be no problems such as evolution of gas or deposition of lithium metal. The present invention has been accomplished on the basis of this discovery. Namely, the present invention provides the following lithium ion capacitor.

(1) A lithium ion capacitor comprising a positive electrode, a negative electrode and an aprotic organic solvent solution of a lithium salt as an electrolytic solution, wherein a positive electrode active material is a material capable of reversibly supporting lithium ions and/or anions, a negative electrode active material is a material capable of reversibly supporting lithium ions, and the potential of the positive electrode is at most 2.0 V after the positive electrode and the negative electrode are short-circuited, characterized in that the positive electrode and the negative electrode are respectively made by forming electrode layers by the positive electrode active material and the negative electrode active material on both sides of a positive electrode current collector and a negative electrode current collector each having pores penetrating from the front surface to the back surface, the capacitor has such a cell structure that the positive electrode and the negative electrode are wound or laminated, and the outermost portion of the wound or laminated electrodes is the negative electrode.

(2) The lithium ion capacitor according to the above (1), wherein lithium ions are preliminarily supported by the negative electrode and/or the positive electrode by electrochemically contact with lithium metal disposed to face the negative electrode with the negative electrode and/or the positive electrode.

(3) The lithium ion capacitor according to the above (1) or (2), wherein when the cell comprises at least two electrode laminate units having the positive electrode and the negative electrode wound or laminated, the outermost portion of the electrode laminate units is the negative electrode.

(4) The lithium ion capacitor according to the above (1), (2) or (3), wherein the positive electrode active material is any one of (a) an activated carbon, (b) an electrically conductive polymer and (c) a polyacenic organic semiconductor (PAS) which is a heat-treated aromatic condensed polymer, having a polyacenic skeleton structure having an atomic ratio of hydrogen atoms/carbon atoms of from 0.05 to 0.50.

(5) The lithium ion capacitor according to any one of the above (1) to (4), wherein the negative electrode active material is any one of (a) graphite, (b) hardly graphitizable carbon and (c) a polyacenic organic semiconductor (PAS) which is a heat-treated aromatic condensed polymer, having a polyacenic skeleton structure with an atomic ratio of hydrogen atoms/carbon atoms of from 0.05 to 0.50.

(6) The lithium ion capacitor according to any one of the above (1) to (5), wherein the capacitance per unit weight of the negative electrode active material is at least three times the capacitance per unit weight of the positive electrode active material, and the weight of the positive electrode active material is larger than the weight of the negative electrode active material.

EFFECTS OF THE INVENTION

In the lithium ion capacitor of the present invention, a current collector having pores penetrating from the front surface to the back surface is used as each of current collectors for a positive electrode and a negative electrode, each having electrode layers on both sides of the current collector, are laminated to constitute a cell, and the outermost portion of such laminated electrodes is the negative electrode. Therefore, even when a negative electrode having electrode layers on both sides of the current collector is used for the outermost negative electrode and thus a load corresponding to electrodes on both sides of the outermost negative electrode is applied to an opposite positive electrode, the load on the positive electrode has relatively surplus to the upper limit potential. Accordingly, such a lithium ion capacitor is a lithium ion capacitor having high safety without evolution of gas, deposition of lithium metal, etc.

Further, according to such a cell structure, a cell can be constituted only by electrodes (positive electrode and negative electrode) each having electrode layers on both sides of a current collector having pores penetrating from the front surface to the back surface, without using an electrode having an electrode layer only on one side of a current collector for the outermost electrode as in a conventional lithium ion capacitor. Therefore, it is not required to distinguish an electrode having electrode layers on both sides of a current collector and an electrode having an electrode layer only on one side, whereby a cell will be easily assembled, and workability will improve.

EXPLANATION OF SYMBOLS

Figure 1:
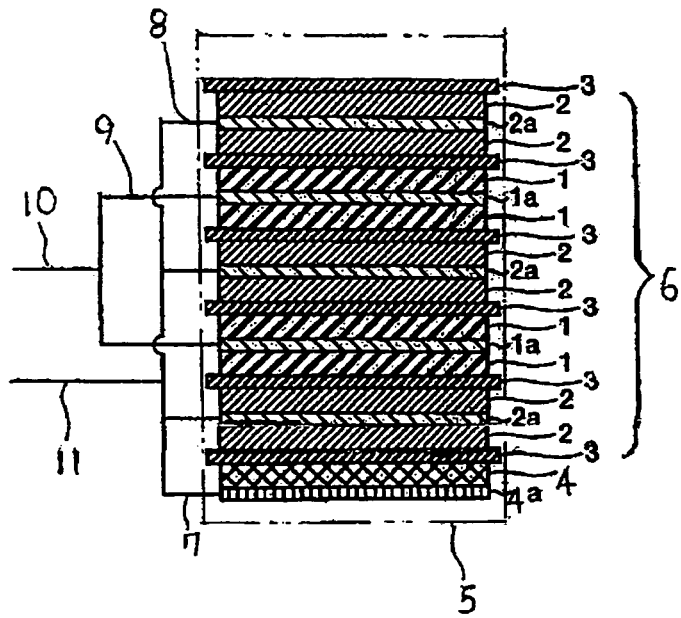
FIG. 1 is a schematic cross section illustrating a lithium ion capacitor as a preferred embodiment of the present invention.

1: positive electrode, 1a: positive electrode current collector, 2: negative electrode, 2a: negative electrode current collector, 3: separator, 4: lithium metal, 4a: lithium electrode current collector, 5: container, 6: electrode laminate unit, 7: lithium electrode lead-out portion, 8, 9: lead-out portions, 10: positive electrode connection terminal, 11: negative electrode connection terminal, 12: through-pore, 13: electrode, 14: electrode layer, 15: opposite electrode layer

BEST MODE FOR CARRYING OUT THE INVENTION

The lithium ion capacitor (hereinafter sometimes referred to as LIC) of the present invention comprises a positive electrode, a negative electrode and an aprotic organic electrolytic solution of a lithium salt as an electrolytic solution, wherein a positive electrode active material is a material capable of reversibly supporting lithium ions and/or anions, a negative electrode active material is a material capable of reversibly supporting lithium ions, and the potentials of the positive electrode and the negative electrode are at most 2.0 V after the positive electrode and the negative electrode are short-circuited.

In a conventional electric double layer capacitor, usually the same active material (mainly an activated carbon) is used for the positive electrode and the negative electrode in substantially the same amounts. This active material has a potential of about 3 V when a cell is assembled, and after the capacitor is charged, anions form an electric double layer at the surface of the positive electrode thereby to increase the positive electrode potential, and on the other hand, cations form an electric double layer at the surface of the negative electrode thereby to decrease the potential. On the contrary, at the time of discharge, anions and cations, respectively from the positive electrode and the negative electrode, are discharged to the electrolytic solution, and the potentials respectively decreases and increases thereby to recover to about 3 V. As mentioned above, as a common carbon material has a potential of about 3.0 V, in an organic electrolyte capacitor using a carbon material for both the positive electrode and the negative electrode, potentials of the positive electrode and the negative electrode are both about 3 V after the positive electrode and the negative electrode are short-circuited.

On the other hand, in LIC of the present invention, potentials of the positive electrode and the negative electrode after the positive electrode and the negative electrode are short-circuited are at most 2.0 V ($Li/Li^+$, the same applies hereinafter) as mentioned above. That is, in the present invention, an active material capable of reversibly supporting lithium ions and/or anions is used for the positive electrode, an active material capable of reversibly supporting lithium ions is used for the negative electrode, and lithium ions are preliminarily made to be supported by the negative electrode and/or the positive electrode so that the potentials of the positive electrode and the negative electrode are at most 2.0 V after the positive electrode and the negative electrode are short-circuited.

In the present invention, the potential of the positive electrode being at most 2V after the positive electrode and the negative electrode are short-circuited, means a potential of the positive electrode of at most 2 V as obtained by either of the following two methods (A) and (B). That is, (A) after doping with lithium ions, a positive electrode terminal and a negative electrode terminal of a capacitor cell are directly connected by a conducting wire and the capacitor is left to stand for at least 12 hours in such a state, and then the short circuit is released, and the positive electrode potential is measured within 0.5 to 1.5 hours, (B) after discharging to 0 V at a constant current over a period of at least 12 hours by a charge and discharge testing apparatus, a positive electrode terminal and a negative electrode terminal are connected by a conducting wire and the capacitor is left to stand for at least 12 hours in such a state, and then the short circuit is released, and the positive electrode potential is measured within 0.5 to 1.5 hours.

Further, in the present invention, the positive electrode potential being at most 2.0 V after the positive electrode and the negative electrode are short-circuited is not limited only to the potential immediately after doping with lithium ions, but means a positive electrode potential of at most 2.0 V after short circuit in any state, i.e. short circuit in a charged state, in a discharged state or after repeated charge and discharge.

In the present invention, the positive electrode potential being at most 2.0 V after the positive electrode and the negative electrode are short-circuited, will be described in detail below. As described above, an activated carbon and a carbon material usually have a potential nearly 3 V ($Li/Li^+$). In a case where an activated carbon is used for both the positive electrode and the negative electrode to assemble a cell, since both potentials are about 3 V, the positive electrode potential will be unchanged and about 3 V even when the electrodes are short-circuited. Further, also in the case of a hybrid capacitor using an activated carbon for the positive electrode and using for the negative electrode a carbon material such as graphite or hardly graphitizable carbon to be used for a lithium ion secondary battery, since both the potentials are about 3 V, the positive electrode potential will be unchanged and about 3 V even when the electrodes are short-circuited. The negative electrode potential will move to the vicinity of 0 V by charging cell although the potential depends on the balance of positive electrode and negative electrode weights, and it is thereby possible to increase the charge voltage, whereby a capacitor having a high voltage and a high energy density will be obtained. In general, the upper limit of the charge voltage is determined to be a voltage at which no decomposition of the electrolyte solution at the positive electrode potential will occur. Thus, when the positive electrode potential is at the upper limit, it is possible to increase the charge voltage correspondingly to a decrease of the negative electrode potential. However, in the above-described hybrid capacitor of which the positive electrode potential is about 3 V at the time of short circuit, if the upper limit potential of the positive electrode is 4.0 V for example, the positive electrode potential at the time of discharge is limited to 3.0 V, and the change in potential of the positive electrode is at a level of 1.0 V and the capacity of the positive electrode can not sufficiently be utilized. Further, it has been known that when lithium ions are inserted into (charge) and released from (discharge) the negative electrode, the initial charge and discharge efficiency is low in many cases, and some lithium ions can not be released at the time of discharge. This is explained to be because the lithium ions are consumed for decomposition of the electrolytic solution at the surface of the negative electrode or they are trapped in structural defective portions of the carbon material. In such a case, the charge and discharge efficiency of the negative electrode tends to be low as compared with the charge and discharge efficiency of the positive electrode, the positive electrode potential will be higher than 3 V when the cell is short-circuited after charge and discharge are repeatedly carried out, and the utilized capacity will further decrease. That is, if the positive electrode is discharged only from 4.0 V to 3.0 V even if it is supposed to be discharged from 4.0 V to 2.0 V, only half the capacity is utilized, and the capacitor can not have a large capacity although it may have a high voltage.

In order to achieve not only a high voltage and a high energy density but also a large capacity and further a high energy density of a hybrid capacitor, it is required to improve the utilized capacity of the positive electrode. That is, when the positive electrode potential after the short circuit is lower than 3.0 V, the utilized capacity will increase correspondingly, and a large capacity will be achieved. In order that the positive electrode potential will be at most 2.0 V, it is preferred to charge the negative electrode with lithium ions not only in an amount of lithium ions to be supplied by the charge and discharge of the cell but also separately from a lithium ion supply source such as lithium metal. On this case, as the lithium ions are supplied other than from the positive electrode and the negative electrode, both the positive electrode potential and the negative electrode potential are at equilibrium potential of lithium metal at the time of short circuit and at most 3.0 V. The larger the amount of lithium metal, the lower the equilibrium potential. As the equilibrium potential changes depending upon the negative electrode material and the positive electrode material, it is required to adjust the amount of lithium ions to be supported by the negative electrode considering characteristics of the negative electrode material and the positive electrode material so that the positive electrode potential after short circuit will be at most 2.0 V.

In LIC of the present invention, the positive electrode potential being at most 2.0 V after the positive electrode and the negative electrode are short-circuited, means that lithium ions are supplied to the positive electrode and/or the negative electrode other than from the positive electrode and the negative electrode of the LIC as mentioned above. The lithium ions may be supplied to one of or both the negative electrode and the positive electrode. However, in a case where an activated carbon is used for the positive electrode for example, if the amount of lithium ions supported is large and the positive electrode potential is low, lithium ions may be irreversibly consumed, and drawbacks such as a decrease in the capacity of the cell may occur in some cases. Thus, it is required to suitably control the amount of lithium ions to be supplied to the negative electrode and the positive electrode so that there will be no drawbacks.

Further, in a case where the positive electrode potential is higher than 2.0 V after the positive electrode and the negative electrode are short-circuited, as the amount of lithium ions supplied to the positive electrode and/or the negative electrode is small, the energy density of the cell tends to be low. The larger the amount of lithium ions supplied, the lower the positive electrode potential after the positive electrode and the negative electrode are short-circuited and the more the energy density will improve. In order to obtain a high energy density, at most 2.0 V is preferred, and in order to obtain a further higher energy density, at most 1.0 V (Li/Li$^+$) is preferred. If the positive electrode potential is lower than 1.0 V, drawbacks such as evolution of gas or irreversible consumption of lithium ions may occur depending upon the positive electrode active material, and it tends to be difficult to measure the positive electrode potential. Further, a too low positive electrode potential means an excessive weight of the negative electrode, and the energy density will rather decrease. It is usually at least 0.1 V, preferably at least 0.3 V.

In the present invention, the capacitance and the capacity are defined as follows. The capacitance of a cell represents the slope of a discharge curve of a cell and its unit is F (farad); the capacitance per unit weight of a cell is a value obtained by dividing the capacitance of a cell by the total weight of the positive electrode active material and the negative electrode active material and its unit is F/g; the capacitance of a positive electrode represents the slope of a discharge curve of a positive electrode and its unit is F; the capacitance per unit weight of a positive electrode is a value obtained by dividing the capacitance of a positive electrode by the weight of a positive electrode active material put in a cell and its unit is F/g; and the capacitance of a negative electrode is a value obtained by dividing the capacitance of a negative electrode by the weight of a negative electrode active material put in a cell and its unit is F/g.

Further, the cell capacity is a product of the capacitance of a cell and a difference between the discharge starting voltage and the discharge completion voltage of a cell i.e. a change in the voltage, and its unit is C (coulomb). 1 C is charge quantity when 1 A current is applied in one second, and thus the unit is calculated as mAh in the present invention. The positive electrode capacity is a product of the capacitance of the positive electrode and a difference (a change in positive electrode potential) between the positive electrode potential when discharge starts and the positive electrode potential when discharge is completed, and its unit is C or mAh. Similarly, the negative electrode capacity is a product of the capacitance of the negative electrode and a difference (change in negative electrode potential) between the negative electrode potential when discharge starts and the negative electrode potential when discharge is completed, and its unit is C or mAh. The cell capacity agrees with the positive electrode capacity and the negative electrode capacity.

Now, the structure of the lithium ion capacitor of the present invention will be described with reference to drawings. The following drawings are to exemplify preferred embodiments of the present invention, and the present invention is by no means restricted thereto. FIG. 1 is a cross section illustrating one example of the structure of the lithium ion capacitor (hereinafter sometimes referred to as a cell) of the present invention.

In the present invention, the cell is constituted, as shown in FIG. 1, in such a manner that positive electrodes 1 and negative electrodes 2 are alternately laminated with separators 3 interposed therebetween to form an electrode laminate unit 6, which is installed in a container 5 (imaginary line), and lithium metal (lithium electrode) 4 is disposed to face the positive electrode 1 and the negative electrode 2 laminated on the upper portion of the electrode laminate unit 6. The lithium metal 4 is a lithium ion supply source. The positive electrodes 1 laminated are connected to a positive electrode connection terminal 10 by means of a lead-out portion 9 e.g. by welding, and the negative electrodes 2 and the lithium metal 4 are connected to a negative electrode connection terminal 10 by means of a lead-out portion 8 and a lithium electrode lead-out portion 7, respectively. In this embodiment, the positive electrode connection terminal 9 and the negative electrode connection terminal 10 are shown on the same side (the left side in FIG. 1) of the electrode laminate unit 6 for convenience sake, but in the case of a rectangular cell, they are preferably provided dividedly on each side of the electrode laminate unit 6, and the positions of such connection terminals can suitably be changed.

Into the cell thus constituted, an electrolytic solution capable of transferring lithium ions is injected and sealed, and the cell is left to stand in such a state for a predetermined time (e.g. 10 days), whereupon the lithium metal 4 and the negative electrodes 2 are short-circuited, and since positive electrode current collectors 1a and negative electrode current collectors 2a are porous bodies as described hereinafter, the negative electrodes 2 can preliminarily be doped with lithium ions. In the present invention, the "positive electrode" means an electrode on the side where a current flows out at the time of discharge and a current flows in at the time of charge, and the "negative electrode" means an electrode on the side where a current flows in at the time of discharge and a current flows out at the time of charge.

As shown in FIG. 1, the electrode laminate unit 6 comprises the positive electrodes 1 each having electrode layers (positive electrode active material) on both sides of the positive electrode current collector 1a, and the negative electrodes 2 each having electrode layers (negative electrode active material) on both sides of the negative electrode current collector 2a, alternately laminated with the separators 3 interposed therebetween so that they are not in contact with one another, and the outermost portions of the laminated electrodes (the upper and lower portions of the electrode laminate unit 6 in FIG. 1) are the negative electrodes 2. Namely, in the lithium ion capacitor of the present invention, all the electrodes are electrodes having electrode layers on both sides of an electrode current collector, whereas in a conventional lithium ion capacitor, outermost electrodes among electrodes constituting the cell are electrodes having an electrode layer only on one side of a current collector as mentioned above.

In the electrode laminate unit 6, it is preferred to dispose the separator 3 at the outside of the outermost negative electrode 2. By disposing the separator 3 at the outside of the outermost negative electrode 2 in such a manner, when the lithium metal 4 is disposed to face this negative electrode, direct contact of the lithium metal 4 to the electrode can be avoided, whereby the damage on the surface of the electrode by quick doping at the time of injecting the electrolytic solution can be prevented, and further, in a case where the electrode laminate unit 6 is preliminarily assembled outside and then installed in the container 5, it is possible to protect the electrodes by covering them with the separator 3.

Figure 2:
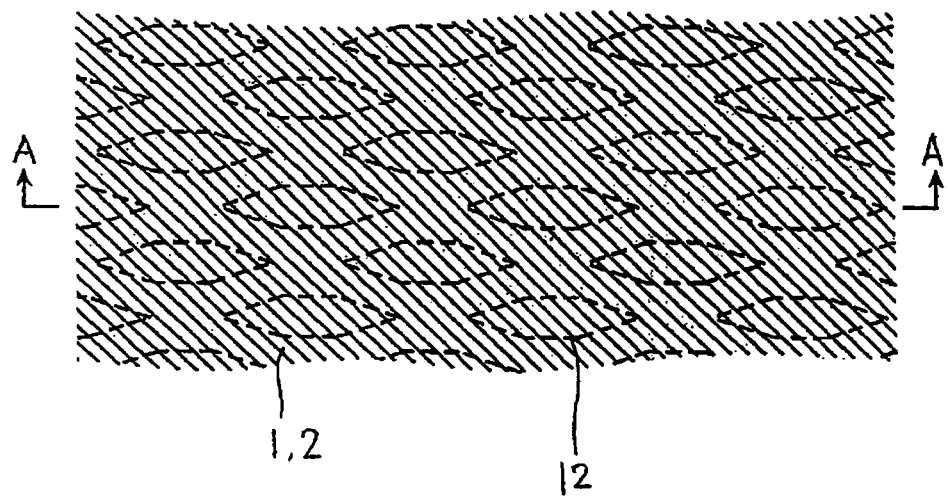
FIG. 2 is an enlarged plan view illustrating each of a positive electrode and a negative electrode in FIG. 1.
Figure 3:
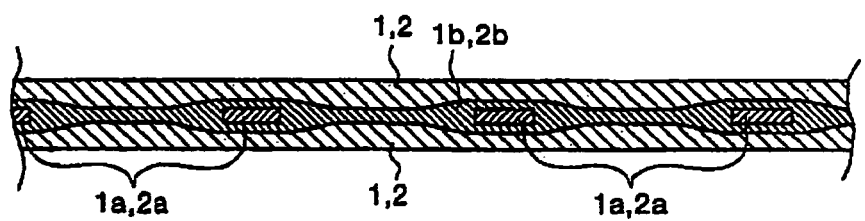
FIG. 3 is a cross section at A-A portion in FIG. 2.

As each of the positive electrode current collector 1a and the negative electrode current collector 2a of the present invention, a porous body having pores (through pores) penetrating from the front surface to the back surface, is used. FIG. 2 is an enlarged plan view illustrating the positive electrode 1 and the negative electrode 2 using the positive electrode current collector 1a and the negative electrode current collector 2a each having through pores. This embodiment is an example using an expanded metal as the electrode current collector, and portions surrounded by dotted lines are through pores 12. FIG. 3 is a cross section at A-A portion in FIG. 1. As shown in the drawing, with respect to the electrode current collectors (positive electrode current collector 1a, negative electrode current collector 2a), the through pores 12 of the expanded metal are clogged with each of electrically conductive materials 1b and 2b, and each of the positive electrode 1 and the negative electrode 2 is formed on the electrically conductive material on both sides of the expanded metal in which the through pores 12 are clogged.

In the present invention, by use of electrode current collectors having the through pores 12 as the electrode current collectors 1a and 2a of the positive electrode 1 and the negative electrode 2 constituting the electrode laminate unit 6, the following effects will be obtained. One effect is that even if the through pores are clogged with the electrically conductive material, lithium ions can freely pass through the electrically conductive material and thereby move in the electrode laminate unit via the through pores of the electrodes laminated, whereby the negative electrode can be doped with the lithium ions. Further, even if an electrode having electrode layers on both sides of a current collector is used as a negative electrode to be disposed at the outermost portion of the electrode laminate unit 6, as the current collector has through pores, lithium ions in the electrode layer formed at the outside of the current collector can move toward and from the opposite positive electrode via the through pores by charging and discharging of the cell. Accordingly, that an electrode having electrode layers on both sides of a current collector can be used for the outermost negative electrode, closely relates to the current collector having through pores, and will be possible by use of a current collector having through pores for the first time.

In this embodiment, the electrode laminate unit 6 is constituted by four positive electrodes and six negative electrodes as the number of active substance layers. However, the number of the positive electrode and negative electrode layers assembled in a cell depends on the type and the capacity of the cell, the number of layers of lithium metal to be disposed in the cell, etc., and is not restricted. It is usually at a level of from 10 to 20 layers. Further, the electrode laminate unit 6 may be accommodated in the container 5 in a vertical direction.

Figure 4:
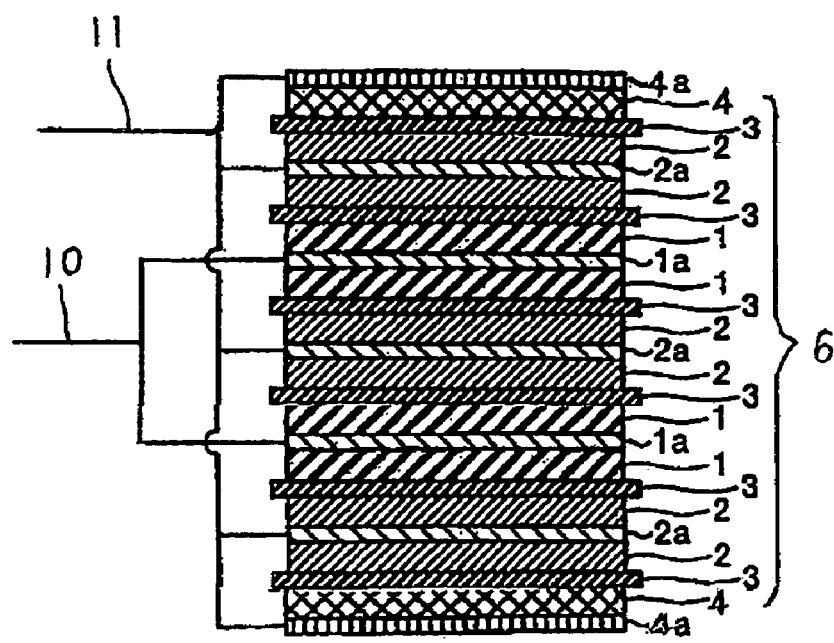
FIG. 4 is a cross section illustrating an electrode laminate unit as another embodiment of the present invention.
Figure 5:
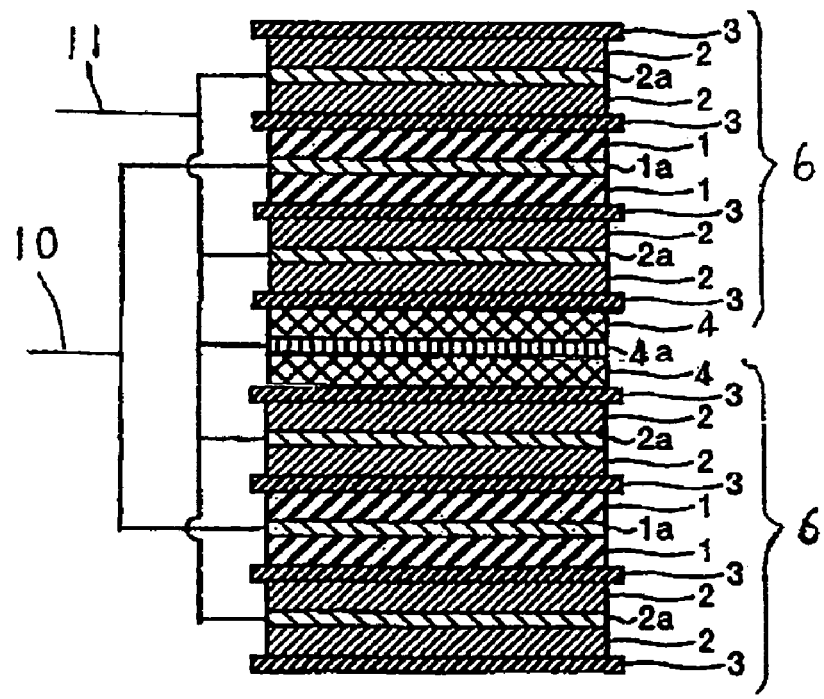
FIG. 5 is a cross section illustrating an electrode laminate unit as another embodiment of the present invention.

FIGS. 4 and 5 illustrate other embodiments of a rectangular laminate type lithium ion capacitor. FIG. 4 illustrates an example wherein lithium metal 4 is disposed on the upper and lower portions of an electrode laminate unit 6 constituting the cell. By disposing the lithium electrodes 4 on the two positions i.e. on the upper and lower portions of the electrode laminate unit 6 in such a manner, the negative electrodes can preliminarily be doped with lithium ions evenly in a short time, whereby the productivity and the quality of the cell will further improve. In the electrode laminate unit 6, each of the positive electrodes 1 and the negative electrodes 2 has electrode layers on both sides of an electrode current collector having through pores, and the structure of the cell is substantially the same as that of the lithium ion capacitor as shown in FIG. 1.

Further, FIG. 5 illustrates an example wherein the cell is constituted by two or more electrode laminate units 6, and lithium metal 4 is disposed between the electrode laminate units 6. According to this embodiment, a large capacity cell will easily be produced and at the same time, such an embodiment is likely to be applicable to cells for various purposes, since the degree of freedom of cell design will increase. Further, it is also possible to dispose lithium metal 4 further on the upper and lower portions of the cell in FIG. 5 although it is not shown, and by disposing lithium metal 4 between the electrode laminate units 6 and at the outside thereof in such a manner, the negative electrodes 2 can be doped with lithium ions in a short time.

Figure 6:
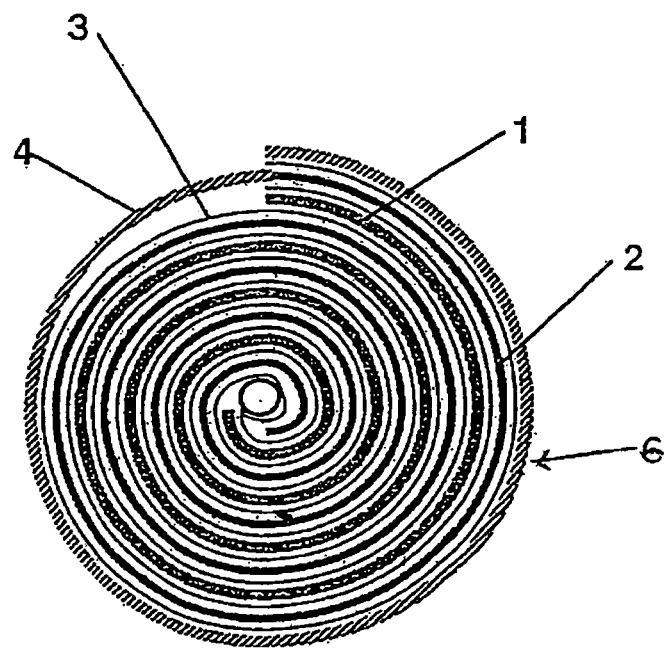
FIG. 6 is a cross section illustrating a wound type electrode laminate unit as another embodiment of the present invention.

FIG. 6 is a cross section illustrating a wound type lithium ion capacitor as another embodiment of the present invention. The cell of this embodiment is constituted by a cylindrical electrode laminate unit 6. This cylindrical electrode laminate unit 6 has a laminate structure obtained by laminating a positive electrode 1 and a negative electrode 2, each having electrode layers on both sides of a strip electrode current collector (not shown), by means of a separator 3 interposed therebetween, and winding the laminate in a circular form. For the above electrode current collector, a porous body is used. According to such a laminate structure, the electrode laminate unit 6 comprises electrodes each having electrode layers on both sides of a current collector, and its outermost electrode is the negative electrode. The cell is constituted by disposing a separator 3 at the outside of the outermost negative electrode and winding lithium metal 4 at the outside thereof so as to face the outermost negative electrode.

Figure 7:
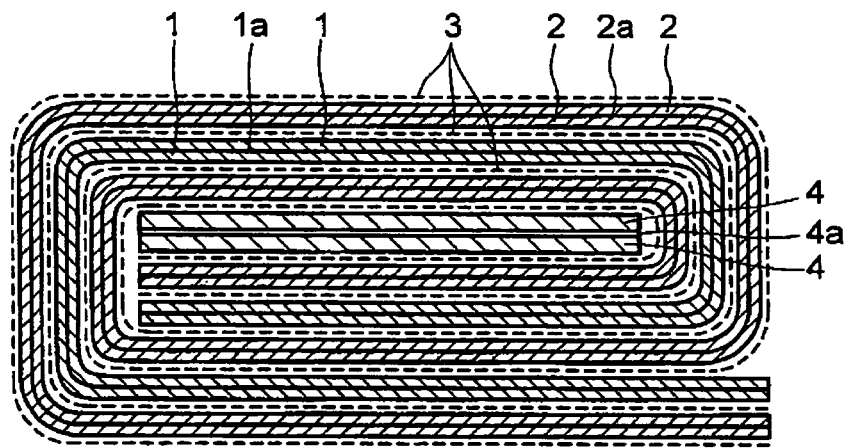
FIG. 7 is a cross section illustrating another wound type electrode laminate unit as another embodiment of the present invention.
Figure 8:
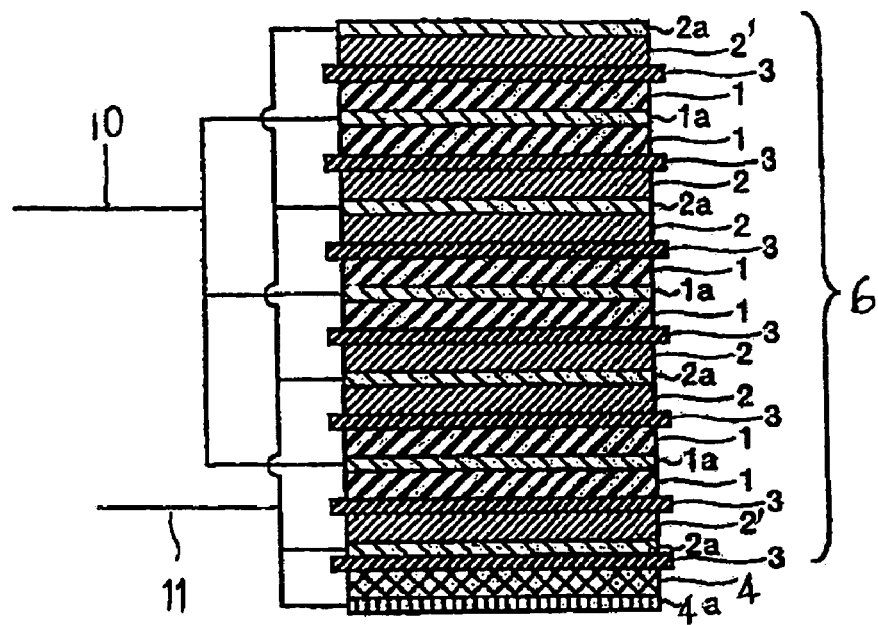
FIG. 8 is a schematic cross section illustrating a conventional lithium ion capacitor.
Figure 9:
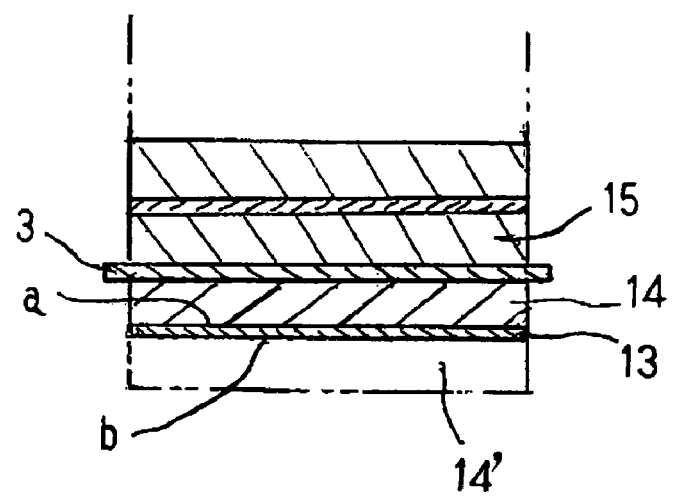
FIG. 9 is a schematic cross section illustrating an outermost portion of a conventional lithium ion capacitor.

FIG. 7 is a cross section illustrating another wound type lithium ion capacitor as another embodiment of the present invention. The electrode laminate unit of this example has a laminate structure having electrodes wound in the same manner as in the above-mentioned cylindrical electrode laminate unit, but this laminate structure is flat. Namely, this electrode laminate unit can be obtained in such a manner that a positive electrode 1 having electrode layers on both sides of a positive electrode current collector 1a and a negative electrode 2 having electrode layers on both sides of a negative electrode current collector 2a are wound in an elliptic form with a separator 3 interposed therebetween so that the innermost and outermost portions of the electrode laminate unit are the negative electrode, and this wound roll is pressed from both sides. As each of the current collectors 1a and 2a, a porous body having through pores is used. Further, it is preferred to dispose the separator 3 in the inside of the innermost negative electrode and at the outside of the outermost negative electrode of the electrode laminate unit.

To constitute a cell using the above electrode laminate unit, a cell can be constituted by inserting lithium metal 4 at e.g. the center portion of the laminate wound in an elliptic form so that the lithium metal faces the innermost negative electrode 2, and then pressing the electrode laminate unit. In such a case, with respect to the lithium metal 4, it is preferred that a lithium electrode current collector 4a has the lithium metal 4 on both sides as shown in FIG. 7, whereby the facing negative electrodes can be doped with lithium ions on both sides of the lithium electrode current collector 4a. Further, it is also possible to dispose lithium metal 4 to face the outermost negative electrode of the flat electrode laminate unit to constitute a cell.

Now, chief components constituting the lithium ion capacitor of the present invention will be explained below.

For the positive electrode current collector and the negative electrode current collector of the present invention, various materials proposed for use in e.g. an organic electrolyte battery can be usually used. For the positive electrode current collector, aluminum, stainless steel, etc. can be suitably used, and for the negative electrode current collector, stainless steel, copper, nickel, etc. can be suitably used. Further, various shapes such as a foil and a net can be employed. Particularly in order that lithium ions are preliminarily supported by the negative electrode and/or the positive electrode, preferred is one having pores penetrating from the front surface to the back surface, such as an expanded metal, a punched metal, a metal net, a foamed body or a porous foil having through pores imparted by etching. The through pores of the electrode current collector may, for example, be round or rectangular, and may suitably be set.

More preferably, before formation of an electrode, at least some of the through pores on the electrode current collector are clogged with an electrically conductive material which is less likely to separate off, and each of a positive electrode and a negative electrode is formed thereon by using an active material, whereby productivity of the electrode will improve and further, a problem of a decrease in reliability of a capacitor by separation of the electrode will be solved. Further, the electrode including the current collector can be made thin, whereby a high energy density and a high output density will be realized.

The shape, number, etc. of the through pores of the electrode current collector may suitably be set so that lithium ions in an electrolytic solution as described hereinafter can move from the front surface to the back surface of the electrode without being blocked by the electrode current collector, and that the pores will easily be clogged with an electrically conductive material.

The porosity of the electrode current collector is defined by calculating the ratio {1−(weight of the current collector/true specific gravity of the current collector)/(apparent volume of the current collector)} as percentage. The porosity of the electrode current collector to be used in the present invention is usually from 10 to 79%, preferably from 20 to 60%. It is desirable to suitably select the porosity and the pore size of the electrode current collector from the above range considering the structure and the productivity of the cell.

The above negative electrode active material is not particularly limited so long as it can reversibly support lithium ions, and it may, for example, be graphite, hardly graphitizable carbon or a polyacenic organic semiconductor (PAS) which is a heat-treated aromatic condensed polymer having a polyacenic skeleton structure having an atomic ratio of hydrogen atoms/carbon atoms of from 0.50 to 0.05. Among them, PAS is more preferred with a view to obtaining a large capacity. A capacitance of at least 650 F/g will be obtained when PAS to which lithium ions in an amount of 400 mAh/g are supported (charged) is discharged, and a capacitance of at least 750 F/g will be obtained when lithium ions in an amount of at least 500 mAh/g are charged. Thus, it is understood that PAS has a very large capacitance.

In the preferred embodiment of the present invention, in a case where an active material having an amorphous structure such as PAS is used for the negative electrode, the larger the amount of lithium ions to be supported, the lower the potential. Thus the withstand voltage (charge voltage) of an electrical storage device to be obtained tends to increase, and the voltage-increasing rate (the slope of the discharge curve) in discharge tends to be low. Therefore, it is desirable to suitably set the amount of lithium within the lithium absorbing power of the active material depending upon the desired working voltage of the an electrical storage device.

Further, PAS, which has an amorphous structure, is free from structural changes such as swelling and contraction due to insertion and leaving of lithium ions and is thereby excellent in cyclic characteristics. Further, it has an isotropic molecular structure (a higher-order structure) for insertion and leaving of lithium ions and thereby has excellent characteristics in quick charge and quick discharge, and accordingly it is suitable as a negative electrode material.

An aromatic condensed polymer which is a precursor of PAS is a condensed product of an aromatic hydrocarbon compound with an aldehyde. The aromatic hydrocarbon compound may be suitably a so-called phenol such as phenol, cresol or xylenol. Specifically, it may be a methylene-bisphenol represented by the following formula:

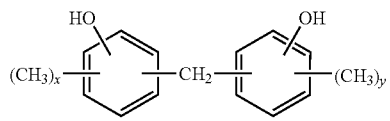

wherein each of x and y which are independent of each other, is 0, 1 or 2, or a hydroxy-bisphenyl or a hydroxynaphthalene. Among them, practically a phenol, particularly phenol is suitable.

Further, the aromatic condensed polymer may also be a modified aromatic condensed polymer having part of the above aromatic hydrocarbon compound having a phenolic hydroxyl group substituted by an aromatic hydrocarbon compound having no phenolic hydroxyl group such as xylene, toluene or aniline, for example, a condensed product of phenol, xylene and formaldehyde. Further, a modified aromatic polymer substituted by melamine or urea may also be used, and a furan resin is also suitable.

In the present invention, PAS is used as an insoluble and infusible substrate, and the insoluble and infusible substrate may be produced, for example, from the above aromatic condensed polymer as follows. Namely, the aromatic condensed polymer is gradually heated to an appropriate temperature of from 400 to 800° C. in a non-oxidizing atmosphere (including vacuum) to obtain an insoluble and infusible substrate having an atomic ratio of hydrogen atoms/carbon atoms (hereinafter referred to as H/C) of from 0.5 to 0.05, preferably from 0.35 to 0.10.

However, the method of producing the insoluble and infusible substrate is not limited thereto, and it is possible to obtain an insoluble and infusible substrate having the above H/C and having a specific surface area of at least 600 m$^2$/g as measured by a BET method, by a method as disclosed in JP-B-3-24024, for example.

With respect to the insoluble and infusible substrate to be used in the present invention, in X-ray diffraction (CuKα), the main peak is present at the position of at most 24° as represented by 2θ, and another broad peak is present at a position of from 41 to 46° in addition to the above main peak. Namely, the insoluble and infusible substrate has a polyacenic skeleton structure having an aromatic polycyclic structure appropriately developed, has an amorphous structure, and is capable of being stably doped with lithium ions, and is thereby suitable as an active material for a lithium storage device.

In the present invention, the negative electrode active material is preferably one having a pore diameter of at least 3 nm and a pore volume of at least 0.10 ml/g, and the upper limit of the pore diameter is not limited but is usually from 3 to 50 nm. Further, the range of the pore volume is also not particularly limited, but is usually from 0.10 to 0.5 ml/g, preferably from 0.15 to 0.5 ml/g.

In the present invention, the negative electrode is formed on a negative electrode current collector from a powder of a negative electrode active material such as the above carbon material or PAS, and its method is not limited and a known method may be used. Specifically, it can be formed by dispersing a negative electrode active material powder, a binder and if necessary, an electrically conductive powder in an aqueous or organic solvent to obtain a slurry, and applying the slurry on the current collector or preliminarily forming the slurry into a sheet, and bonding the sheet on the current collector. The binder to be used may, for example, be a rubber type binder such as SBR, a fluororesin such as polytetrafluoroethylene or polyvinylidene fluoride, or a thermoplastic resin such as a polypropylene or a polyethylene. Among them, a fluorinated binder is preferred, a fluorinated binder having an atomic ratio of fluorine atoms/carbon atoms (hereinafter referred to as F/C) of at least 0.75 and less than 1.5, is more preferred, and a fluorinated binder having a F/C of at least 0.75 and less than 1.3, is furthermore preferred. The amount of the binder to be used varies depending upon the type of the negative electrode active material, the electrode shape, etc., but it is from 1 to 20 wt %, preferably from 2 to 10 wt %, based on the negative electrode active material.

Further, the electrically conductive material to be used if necessary may, for example, be acetylene black, graphite or a metal powder. The amount of the electrically conductive material to be used varies depending upon the electrical conductivity of the negative electrode active material, the electrode shape, etc., but a proportion of from 2 to 40 wt % based on the negative electrode active material is suitable. The thickness of the negative electrode active material is set in balance with the thickness of the positive electrode active material so as to secure the energy density of the cell, and considering the output density and the energy density of the cell, industrial productivity, etc, the thickness is usually from 15 to 100 μm, preferably from 20 to 80 μm, on one side of a current collector.

In LIC of the present invention, the positive electrode contains a positive electrode active material capable of reversibly supporting lithium ions and/or anions such as tetrafluoroborate.

The positive electrode active material is not particularly limited so long as it can reversibly support lithium ions and/or anions, and it may, for example, be an activated carbon, an electrically conductive polymer, or a polyacenic organic semiconductor (PAS) which is a heat-treated aromatic condensed polymer having a polyacenic skeleton structure having an atomic ratio of hydrogen atoms/carbon atoms of from 0.05 to 0.50.

A method of forming a positive electrode on a positive electrode current collector by using the above positive electrode active material is substantially the same as in the case of the above negative electrode, and its detailed description is omitted.

Further, in LIC of the present invention, it is preferred that the capacitance per unit weight of the negative electrode active material is at least three times the capacitance per unit weight of the positive electrode active material and that the weight of the positive electrode active material is larger than the weight of the negative electrode active material. By properly controlling the amount of lithium ions charged in the negative electrode (pre-doping amount) considering the capacitance of the positive electrode to be used, the capacitance of at least three times the capacitance per positive electrode unit weight can be secured, and the positive electrode active material weight can be made larger than the negative electrode active material weight. In such a manner, a capacitor having a higher voltage and a larger capacity as compared with a conventional electric double layer capacitor will be obtained. Further, in a case where a negative electrode having a capacitance per unit weight larger than the capacitance per unit weight of the positive electrode is used, it becomes possible to reduce the negative electrode active material weight without changing the change in potential of the negative electrode, whereby the amount of the positive electrode active material charged tends to increase, whereby the capacitance and the capacity of the cell can be increased. The positive electrode active material weight is preferably larger than the negative electrode active material weight, and it is more preferably from 1.1 times to 10 times. If it is less than 1.1 times, the difference in capacity tends to be small, and if it exceeds 10 times, the capacity may be small on the contrary in some cases, and the difference in thickness between the positive electrode and the negative electrode will be too significant, and such is unfavorable in view of the cell structure.

As an electrolyte to be used in LIC of the present invention, an electrolyte capable of transferring lithium ions is used. Such an electrolyte is preferably one which is usually a liquid and which can infiltrate into a separator. As a solvent for such an electrolyte, preferred is an aprotic organic solvent capable of forming an aprotic organic solvent electrolyte solution. The aprotic organic solvent may, for example, be ethylene carbonate, propylene carbonate, dimethyl carbonate, diethyl carbonate, γ-butyrolactone, acetonitrile, dimethoxyethane, tetrahydrofuran, dioxolane, methylene chloride or sulfolane. Further, a liquid mixture having two or more of such aprotic organic solvents mixed may also be used.

Further, as an electrolyte to be dissolved in such a solvent may be one which is capable of transferring lithium ions and which will not cause electrolysis even at a high voltage, and in which lithium ions can be stably present. Such an electrolyte may, for example, be preferably a lithium salt such as $LiClO_4$, $LiAsF_6$, $LiBF_4$, $LiPF_6$ or $Li(C_2F_5SO_2)_2N$.

The above electrolyte and solvent are mixed in a sufficiently dehydrated state to obtain an electrolytic solution. The concentration of the electrolyte in the electrolytic solution is preferably at least 0.1 mol/l so as to reduce the internal resistance by the electrolytic solution, more preferably within a range of from 0.5 to 1.5 mol/l.

Further, as a separator, e.g. a porous body having durability against the electrolytic solution, the electrode active material, etc., having communicating pores and having no electrical conductivity may be used. The material of the separator may, for example, be a cellulose (paper), a polyethylene or a polypropylene, and known one may be used. Among them, a cellulose (paper) is excellent in view of durability and economical efficiency. The thickness of the separator is not limited but is usually preferably from about 20 to about 50 μm.

In LIC of the present invention, when two or more electrode units are laminated in a horizontal direction or in a vertical direction to constitute a cell, as mentioned above, lithium metal is disposed as a lithium ion supply source so that lithium ions are preliminarily supported by the negative electrode and/or the positive electrode, between the electrode units to be laminated, or further at the outside of one or both of the electrode units disposed on both end of the cell. As the lithium metal, a material containing at least lithium element and capable of supplying lithium ions is used, such as lithium metal or a lithium/aluminum alloy.

In such a case, as the amount of the lithium ion supply source (the weight of the material capable of supplying lithium ions such as lithium metal) to be disposed in the interior of the capacitor, an amount with which a predetermined capacity of the negative electrode will be obtained is sufficient. However, an amount larger than this amount is disposed, only a predetermined amount may be used from the lithium metal and the lithium metal is left in the interior of the capacitor. However, considering the safety, it is preferred to dispose only a required amount so that the entire amount is supported by the negative electrode and/or the positive electrode.

In the present invention, it is preferred to form the lithium metal on a lithium electrode current collector comprising an electrically conductive porous body. The electrically conductive porous body to be the lithium electrode current collector is preferably a metal porous body which will not react with the lithium ion supply source, such as a stainless steel mesh. For example, in a case where lithium metal is used as the lithium ion supply source and an electrically conductive porous body such as a stainless steel mesh is used as the lithium electrode current collector, it is preferred that at least part of the lithium metal, preferably at least 80 wt % thereof, is embedded in the pore portion of the lithium electrode current collector, whereby even after the lithium metal is supported by the negative electrode, the space to be formed between the electrodes by disappearance of the lithium metal tends to be small, and reliability of LIC will be more securely maintained.

In a case where the lithium metal is formed on the lithium electrode current collector, the lithium metal may be formed on one side or both sides of the porous lithium electrode current collector. In the case of the lithium metal to be disposed on the outside of the electrode unit disposed at the end of the cell, it is preferred to form the lithium metal only on one side of the lithium electrode current collector which faces the negative electrode of the electrode unit. The thickness of the lithium metal to be contact bonded on the lithium electrode current collector is suitably determined considering the amount of lithium ions to be preliminarily supported by the negative electrode and is not limited, but usually it is from about 50 to about 300 μm on one side of the lithium electrode current collector.

The material of the container of LIC of the present invention is not particularly limited, and various materials commonly used for batteries and capacitors may be used. For example, a metal material such as iron or aluminum, a plastic material or a composite material comprising a laminate thereof, may, for example, be used. Further, the shape of the container is not particularly limited and is suitably selected from a cylindrical form, a rectangular form, etc. depending upon the purpose of use. In view of reduction in size and reduction in weight of LIC, preferred is a container in the form of a film using a laminate film of aluminum with a polymer material such as nylon or polypropylene.

Now, one example of a process for producing LIC of the present invention will be shown below. The through pores of the electrode current collector of LIC may be clogged or may not be clogged with an electrically conductive material, but this example is to explain a case where they are clogged. The through pores of the electrode current collector may be clogged by a known means such as spraying using for example a carbon type electrically conductive material.

Then, each of a positive electrode and a negative electrode is formed on both sides of the electrode current collector of which the through pores are clogged with an electrically conducive material. The positive electrode is formed by mixing a positive electrode active material with a binder resin to form a slurry, which is applied on the current collector for a positive electrode and dried. Likewise, the negative electrode is formed by mixing a negative electrode active material with a binder resin to form a slurry, which is applied on a current collector for a negative electrode and dried.

A lithium electrode is formed by contact bonding lithium metal on a lithium electrode current collector comprising an electrically conductive porous body. The thickness of the lithium electrode current collector is from about 10 to about 200 µm, and the thickness of the lithium metal depends on the amount of the negative electrode active material used but is usually from about 50 to about 300 µm.

After the electrode is dried, it is cut into a width fitted with the size of the container of the cell. On that occasion, it is preferred to cut it into a shape having a lead-out portion as a lead welding portion.

Then, at least three electrode current collectors having electrodes formed thereon are laminated with a separator interposed between the positive electrode and the negative electrode so that they are not in direct contact with each other to assemble an electrode unit, and the outside of the electrode unit is fixed with a tape. On that occasion, the lead-out portions of the positive electrode and the negative electrode are arranged at a predetermined position.

Lithium metal is disposed on the lower and upper portions of the assembled electrode unit. The lead-out portion of the positive electrode current collector is welded to the positive electrode terminal, and the lead-out portions of the negative electrode current collector and the lithium electrode current collector are welded to the negative electrode terminal, e.g. by ultrasonic welding.

The above electrode unit having lithium metal disposed is disposed in a container, and the container is closed by e.g. heat sealing with an inlet for an electrolytic solution unclosed. At least part of the external terminal is exposed to the outside of the container so that it can be connected to an external circuit. An electrolytic solution is injected from the inlet for an electrolytic solution of the container so that the container is filled with the electrolytic solution, and then the inlet for an electrolytic solution is closed by e.g. heat sealing so that the container is completely sealed, to obtain a lithium ion capacitor of the present invention.

When the electrolytic solution is injected, all the negative electrodes and the lithium metal are electrochemically contacted with one another, lithium ions dissolved from the lithium metal into the electrolytic solution move toward the negative electrode through the through pores of the electrode current collectors as time goes by, and lithium ions in a predetermined amount are supported by the negative electrode. At the time of making the lithium ions be supported by the negative electrode, it is preferred to make a device such as application of an external force for fixation so as to prevent deformation of the negative electrode due to strain caused by infiltration of lithium ions into the negative electrode, so as not to impair flatness of the negative electrode. Particularly in the case of a film battery, the contact pressure from the container tends to be weaker than that of batteries using a metal container such as a cylindrical battery and a rectangular battery, whereby it is preferred to apply an external pressure to secure flatness of the positive electrode and the negative electrode, whereby the cell itself is less likely to be distorted, and the cell performance will improve.

In such a manner, in LIC in the preferred embodiment of the present invention, an active material capable of reversibly supporting lithium ions and/or anions is used for the positive electrode, an aprotic organic solvent solution of a lithium salt is used for the electrolytic solution, the negative electrode has a capacitance of at least three times the capacitance per unit weight of the positive electrode active material, the positive electrode active material weight is larger than the negative electrode active material weight, lithium metal to preliminarily dope the negative electrode with lithium is provided in the cell, and the negative electrode before charge can be preliminarily doped with lithium ions.

Further, by using a negative electrode having a large capacitance per unit weight relative to the capacitance per unit weight of the positive electrode, it becomes possible to reduce the negative electrode active material weight with the change in potential of the negative electrode unchanged, whereby the amount of the positive electrode active material to be charged will be large, and the capacitance and the capacity of the cell will be large. Further, as the capacitance of the negative electrode is large, the change in potential of the negative electrode tends to be small, and resultingly the change in potential of the positive electrode tends to be large, and the capacitance and the capacity of the cell tend to be large.

Further, in a conventional electric double layer capacitor, the positive electrode potential will lower only to about 3 V at the time of discharge, but in the lithium ion capacitor of the present invention, the positive electrode potential will be lower to 3 V or below as the negative electrode potential is low, whereby a larger capacity as compared with a conventional electric double layer capacitor will be achieved.

Still further, by preliminarily making lithium ions in a predetermined amount be supported by the negative electrode so as to obtain a required capacity as a negative electrode capacity, the working voltage can be set to be 3 V or higher, and the energy density will improve, as compared with the working voltage of a conventional capacitor of from about 2.3 to about 2.7 V.

Now, the present invention will be explained in detail with reference to specific Examples.

EXAMPLES

Example 1

Process for Producing Negative Electrode 1

A phenol resin molded plate having a thickness of 0.5 mm was put in a Siliconit electric furnace and subjected to a heat treatment by increasing the temperature at a rate of 50° C./hour to 500° C. and further at a rate of 10° C./hour to 660° C. in a nitrogen atmosphere thereby to synthesize PAS. The PAS plate thus obtained was pulverized with a disk mill to obtain a PAS powder. The PAS powder had a H/C ratio of 0.21.

Then, 100 parts by weight of the above PAS powder and a solution having 10 parts by weight of a vinylidene polyfluoride powder dissolved in 80 parts by weight of N-methylpyrrolidone were sufficiently mixed to obtain a slurry. This slurry was applied on one surface of a copper foil having a thickness of 18 μm in an amount of about 7 mg/cm² as a solid content, dried and pressed to obtain a PAS negative electrode 1.

Process for Producing Positive Electrode 1

100 Parts by weight of a commercial activated carbon powder having a specific surface area of 1,950 m²/g and a solution having 10 parts by weight of a vinylidene polyfluoride powder dissolved in 100 parts by weight of N-methylpyrrolidone were sufficiently mixed to obtain a slurry. This slurry was applied on one surface of an aluminum foil having a thickness of 20 μm coated with a carbon type electrically conducted coating, in an amount of about 7 mg/cm² as a solid content, dried and pressed to obtain a positive electrode 1.

Measurement of Capacitance Per Unit Weight of Positive Electrode 1

The above positive electrode 1 was cut out into a positive electrode for evaluation having a size of 1.5×2.0 cm². The positive electrode and lithium metal having a size of 1.5×2.0 cm² and a thickness of 200 μm as an opposite electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used.

Charge to 3.6 V at a charge current of 1 mA was carried out and then constant voltage charge was carried out, and after a total charge time of 1 hour, discharge was carried out to 2.5 V at 1 mA. The capacitance per unit weight of the positive electrode 1 was obtained from the discharge time from 3.5 V to 2.5 V and found to be 92 F/g.

Measurement of Capacitance Per Unit Weight of Negative Electrode 1

The negative electrode 1 was cut into four negative electrodes for evaluation having a size of 1.5×2.0 cm². Each of the negative electrodes and lithium metal having a size of 1.5×2.0 cm² and a thickness of 200 μm as an opposite electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used.

Lithium was charged in an amount of 280 mAh/g, 350 mAh/g, 400 mAh/g or 500 mAh/g based on the negative electrode active material weight at a charge current of 1 mA, and then discharge to 1.5 V was carried out at 1 mA. The capacitance per unit weight of the negative electrode 1 was obtained from the discharge time over which the potential of the negative electrode changed by 0.2 V from the potential which one minute went on after initiation of the discharge. The results are shown in Table 1.

TABLE 1

| Charge amount (mAh/g) | 280 | 350 | 400 | 500 |
|---|---|---|---|---|
| Capacitance per unit weight of negative electrode 1 (F/g) | 308 | 463 | 661 | 758 |

The charge amount in this Example is a value obtained by dividing an integrated charge current which was applied to the negative electrode by the negative electrode active material weight, and its unit is mAh/g.

Process for Producing Negative Electrode 2

The above slurry for the negative electrode 1 was applied on both sides of copper expanded metal (manufactured by Nippon Metal Industry, Co., Ltd.) having a thickness of 32 μm (porosity 50%) by a die coater, followed by pressing to obtain a negative electrode 2 having an entire thickness (the total of the thickness of the negative electrode layers on both sides and the thickness of the negative electrode current collector) of 148 μm.

Process for Producing Positive Electrode 2

A non-aqueous carbon type electrically conductive coating (manufactured by Acheson (Japan) Limited, EB-815) was applied to both sides of aluminum expanded metal (manufactured by Nippon Metal Industry, Co., Ltd.) having a thickness of 35 μm (porosity 50%) by spraying and dried to obtain a current collector for a positive electrode having electrically conductive layers formed thereon. The entire thickness (the total of the current collector thickness and the electrically conductive layer thickness) was 52 μm, and through pores were substantially clogged with the electrically conductive coating. The above slurry for the positive electrode 1 was applied on both sides of the positive electrode current collector by a roll coater, followed by pressing to obtain a positive electrode 2 having an entire thickness (the total of the thickness of the positive electrode layers on both sides, the thickness of the electrically conductive layers on both sides and the thickness of the positive electrode current collector) of 312 μm.

Preparation of Electrode Laminate Unit

The negative electrode 2 having a thickness of 148 μm and the positive electrode 2 having a thickness of 312 μm were cut into sizes of 6.0×7.5 cm² (excluding the terminal welding portion), and they were laminated by using as a separator a cellulose/rayon mixed nonwoven fabric having a thickness of 35 μm so that the terminal welding portions of the positive electrode current collectors and the negative electrode current collectors were opposite to each other, that the positive electrodes and the negative electrodes faced at 20 layers and that the outermost electrodes among the laminated electrodes were the negative electrodes. A separator was disposed at each of the outermost and lowermost portions, four sides were fixed with a tape, and the terminal welding portions (10 sheets) of the positive electrode current collectors and the terminal welding portions (11 sheets) of the negative electrode current collectors, were respectively welded to an aluminum positive electrode terminal and a copper negative electrode terminal each having a width of 50 mm, a length of 50 mm and a thickness of 0.2 mm by ultrasonic welding to obtain an electrode laminate unit. 10 Positive electrodes and 11 negative electrodes were used. The weight of the positive electrode active material was 1.4 times the weight of the negative electrode active material.

Preparation of Cell 1

As a lithium electrode, one having a lithium metal foil (82 μm, 6.0×7.5 cm², corresponding to 200 mAh/g) contact bonded on a stainless steel net having a thickness of 80 μm, was used. One sheet of such a lithium electrode was disposed on each of the upper and lower portions of the electrode laminate unit so that it completely faced the outermost negative electrode to obtain a three electrode laminate unit. The terminal welding portions (2 sheets) of the lithium electrode current collectors were welded to the negative electrode welded portion by resistance welding.

The above three electrode laminate unit was put in the interior of an outer film deep drawn to 6.5 mm and covered with an outer laminate film, and three sides thereof were fused. The unit was vacuum impregnated with a solution having $LiPF_6$ dissolved at a concentration of 1 mol/l in a solvent mixture of ethylene carbonate, diethyl carbonate and propylene carbonate in a weight ratio of 3:4:1 as an electrolytic solution, and the remaining one side was fused, whereby four cells of film type capacitors were assembled. The lithium metal disposed in the cell corresponded to 400 mAh/g per negative electrode active material weight.

Cell Initial Evaluation

20 Days after the cells were left to stand after assembled, one cell was decomposed, whereupon the lithium metal completely disappeared. Accordingly, it was judged that the negative electrodes were preliminarily charged with lithium ions so as to obtain a capacitance of at least 660 F/g per unit weight of the negative electrode active material. The capacitance of the negative electrode is 7.2 times the capacitance of the positive electrode.

Cell Characteristic Evaluation

A constant current/constant voltage charge was carried out for 1 hour, comprising charge at a constant current of 2,000 mA until the cell voltage became 3.6 V and then application of a constant voltage at 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th discharge. The results are shown in Table 2. The data are averages of three cells.

TABLE 2

|  | Capacity (mAh) | Energy density (Wh/l) |
|---|---|---|
| Example 1 | 195 | 12.2 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily making lithium ions be supported by the negative electrodes and/or the positive electrodes so that the positive electrode potential would be at most 2.0 V when the positive electrodes and the negative electrodes were short-circuited.

Comparative Example 1

An electrode laminate unit was obtained in the same manner as in Example 1 except that 11 positive electrodes and 10 negative electrodes were used and that the outermost electrodes were positive electrodes. The weight of the positive electrode active material was 1.7 times the weight of the negative electrode active material. Using as a lithium electrode one having a lithium metal foil (78 μm, 6.0×7.5 cm², corresponding to 200 mAh/g) contact bonded on a stainless steel net having a thickness of 80 μm, one lithium electrode was disposed on each of the upper and lower portions of the electrode laminate unit to prepare a three layer laminate unit, and 4 cells of film type capacitors were assembled in the same manner as in Example 1. The lithium metal disposed in the cell corresponded to 400 mAh/g per negative electrode active material weight.

20 Days after the cells were left to stand after assembled, one cell was decomposed, whereupon the lithium metal completely disappeared. Accordingly, it was judged that the negative electrodes were preliminarily charged with lithium ions so as to obtain a capacitance of 660 F/g per unit weight of the negative electrode active material. The capacitance of the negative electrode is 7.2 times the capacitance of the positive electrode.

A constant current/constant voltage charge was carried out for 1 hour, comprising charge at a constant current of 2,000 mA until the cell voltage became 3.6 V and then application of a constant voltage of 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th discharge. The results are shown in Table 3. The data are averages of 3 cells.

TABLE 3

|  | Capacity (mAh) | Energy density (Wh/l) |
|---|---|---|
| Comparative Example 1 | 185 | 11.8 |

In a case where the outermost electrodes were positive electrode, the capacity after 10 cycles was slightly small. The cells in Example 1 and Comparative Example 1 were decomposed and the surface of the electrodes was observed, whereupon no particular abnormalities were observed on both the positive electrodes and the negative electrodes in Example 1, whereas in the cell in Comparative Example 1, the surface of the negative electrode which faced the outermost positive electrode was thinly covered with deposit considered to be lithium metal. The capacity was considered to be reduced by deposition of the lithium metal. It is estimated that as the current collectors for electrodes had pores penetrating from the front surface to the back surface, if the outermost electrode is a positive electrode, the both sides of the positive electrode and one side of the adjacent negative electrode were charged and discharged, whereby the load increased, the potential decreased as compared with the inner negative electrodes, and the lithium metal deposited. Likewise, in a case where the outermost electrode is a negative electrode as in Example 1, it is estimated that a load is applied to one side of the adjacent positive electrode, and the potential of the one side will be higher than that of the inner positive electrodes. However, since no particular defect was observed, it is preferred to use the negative electrode as the outermost electrode.

Comparative Example 2

An electrode laminate unit was obtained in the same manner as in Example 1 except that 11 positive electrodes and 11 negative electrodes were used and that one of the outermost electrodes was a positive electrode and the other was a negative electrode. The weight of the positive electrode active material was 1.5 times the weight of the negative electrode active material. Using as a lithium electrode one having a lithium metal foil (82 μm, 6.0×7.5 cm², corresponding to 200 mAh/g) contact bonded on a stainless steel net having a thickness of 80 μm, one lithium electrode was disposed on each of the upper and lower portions of the electrode laminate unit to prepare a three layer laminate unit, and 4 cells of film type capacitors were assembled in the same manner as in Example 1. The lithium metal disposed in the cell corresponded to 400 mAh/g per negative electrode active material weight.

20 Days after the cells were left to stand after assembled, one cell was decomposed, whereupon the lithium metal completely disappeared. Accordingly, it was judged that the negative electrodes were preliminarily charged with lithium ions so as to obtain a capacitance of 660 F/g per unit weight of the negative electrode active material. The capacitance of the negative electrode is 7.2 times the capacitance of the positive electrode.

A constant current/constant voltage charge was carried out for 1 hour, comprising charge at a constant current of 2,000 mA until the cell voltage became 3.6 V and then application of a constant voltage of 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th discharge. The results are shown in Table 4. The data are averages of 3 cells.

TABLE 4

|  | Capacity (mAh) | Energy density (Wh/l) |
| --- | --- | --- |
| Comparative Example 2 | 188 | 11.8 |

Also in a case where one outermost electrode was a positive electrode and the other outmost electrode was a negative electrode, the capacitor after 10 cycles was slightly small. In the same manner as in Example 1 and Comparative Example 1, the cell was decomposed to observe the surface of the electrodes, whereupon the surface of the negative electrode which faced the outermost positive electrode was thinly covered with deposit considered to be the lithium metal. It is considered that the capacity decreased by deposition of the lithium metal in the same manner as in Comparative Example 1.

Comparative Example 3

An electrode laminate unit was obtained in the same manner as in Example 1 except that 11 positive electrodes and 10 negative electrodes were used, and that the outermost electrodes were positive electrodes, provided that one electrode layer was separated from each of the outermost positive electrodes, and the surface having the electrode layer formed thereon faced the negative electrode. The positive electrode active material weight was 1.5 times the negative electrode active material weight. Using as a lithium electrode one having a lithium metal foil (78 μm, 6.0×7.5 cm$^2$, corresponding to 200 mAh/g) contact bonded on a stainless steel net having a thickness of 80 μm, one lithium electrode was disposed on each of the upper and lower portions of the electrode laminate unit to prepare a three electrode laminate unit, whereby 4 cells of film type capacitors were assembled in the same manner as in Example 1. The lithium metal disposed in the cell corresponded to 400 mAh/g per negative electrode active material weight.

20 Days after the cells were left to stand after assembled, one cell was decomposed, whereupon the lithium metal completely disappeared. Accordingly, it was judged that the negative electrodes were preliminarily charged with lithium ions so as to obtain a capacitance of 660 F/g per unit weight of the negative electrode active material. The capacitance of the negative electrode is 7.2 times the capacitance of the positive electrode.

A constant current/constant voltage charge was carried out for 1 hour, comprising charge at a constant current of 2,000 mA until the cell voltage became 3.6 V and then application of a constant voltage at 3.6 V. Then, discharge was carried out at a constant current of 200 mA until the cell voltage became 1.9 V. This cycle of from 3.6 V to 1.9 V was repeatedly carried out, and the cell capacity and the energy were evaluated at the 10th discharge. The results are shown in Table 5. The data are averages of three cells.

TABLE 5

|  | Capacity (mAh) | Energy density (Wh/l) |
| --- | --- | --- |
| Comparative Example 3 | 192 | 12.1 |

In a case where one electrode layer was separated from each of the outermost positive electrodes and the surface having the electrode layer formed thereon faced the negative electrode, even when the outermost electrodes are positive electrodes, the capacity after 10 cycles was not decreased. In the same manner as in Comparative Example 2, the cell was decomposed to observe the surface of the electrodes, whereupon no particular defect was observed on the surface of the negative electrode which faced the outermost positive electrode, and no deposition of the lithium metal was observed.

Even when the outermost electrodes are positive electrodes, no decrease in the capacity and the energy density will be observed when one electrode layer is separated from each of the outermost positive electrodes. However, when electrodes each having electrode layers formed on both sides of a current collector are mainly used, a step of separating one electrode layer or a step of disposing such an electrode having one electrode layer to the outermost portion is complicated and unfavorable.

A structure of disposing negative electrodes on the outermost portions so that only electrodes each having electrode layers formed on both sides of a current collector can be used, is preferred in view of performance and in view of industrial application.

INDUSTRIAL APPLICABILITY

The lithium ion capacitor of the present invention is very useful as a driving or auxiliary storage source for electric automobiles, hybrid electric automobiles, etc. Further, it is suitable as a driving storage source for electric automobiles, motorized wheelchairs, etc., an electrical storage device for various energy generation such as solar energy generation or wind power generation, or a storage for domestic electrical equipment.

The entire disclosure of Japanese Patent Application No. 2005-104668 filed on Mar. 31, 2005 including specification, claims, drawings and summary is incorporated herein by reference in its entirety.

The invention claimed is:

1. A lithium ion capacitor comprising a positive electrode, a negative electrode and an aprotic organic solvent solution of a lithium salt as an electrolytic solution, wherein a positive electrode active material is a material capable of reversibly supporting lithium ions and/or anions, a negative electrode active material is a material capable of reversibly supporting lithium ions, and the potential of the positive electrode is at most 2.0 V after the positive electrode and the negative electrode are short-circuited, characterized in that the positive electrode and the negative electrode are respectively made by forming electrode layers by the positive electrode active material and the negative electrode active material on both sides of a positive electrode current collector and a negative electrode current collector each having pores penetrating from the front surface to the back surface, the capacitor has such a cell structure that the positive electrode and the negative electrode are wound or laminated, and the outermost portion of the wound or laminated electrodes is the negative electrode.

2. The lithium ion capacitor according to claim 1, wherein lithium ions are preliminarily supported by the negative electrode and/or the positive electrode by electrochemically contact with a lithium ion supply source disposed to face the negative electrode with the negative electrode and/or the positive electrode.

3. The lithium ion capacitor according to claim 1, wherein when the cell comprises at least two electrode laminate units having the positive electrode and the negative electrode wound or laminated, the outermost portion of the electrode laminate units is the negative electrode.

4. The lithium ion capacitor according to claim 1, wherein the positive electrode active material is any one of (a) an activated carbon, (b) an electrically conductive polymer and (c) a polyacenic organic semiconductor (PAS) which is a heat-treated aromatic condensed polymer, having a polyacenic skeleton structure having an atomic ratio of hydrogen atoms/carbon atoms of from 0.05 to 0.50.

5. The lithium ion capacitor according to claim 1, wherein the negative electrode active material is any one of (a) graphite, (b) hardly graphitizable carbon and (c) a polyacenic organic semiconductor (PAS) which is a heat-treated aromatic condensed polymer, having a polyacenic skeleton structure with an atomic ratio of hydrogen atoms/carbon atoms of from 0.05 to 0.50.

6. The lithium ion capacitor according to claim 1, wherein the capacitance per unit weight of the negative electrode active material is at least three times the capacitance per unit weight of the positive electrode active material, and the weight of the positive electrode active material is larger than the weight of the negative electrode active material.

* * * * *